(12) United States Patent
Ehlen et al.

(10) Patent No.: US 8,688,443 B2
(45) Date of Patent: Apr. 1, 2014

(54) MULTIMODAL AUGMENTED REALITY FOR LOCATION MOBILE INFORMATION SERVICE

(75) Inventors: Patrick Ehlen, San Francisco, CA (US); Michael Johnston, New York, NY (US); Remi Zajac, Pasadena, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 672 days.

(21) Appl. No.: 12/645,589

(22) Filed: Dec. 23, 2009

(65) Prior Publication Data

US 2011/0153310 A1  Jun. 23, 2011

(51) Int. Cl.
*G10L 13/00* (2006.01)

(52) U.S. Cl.
USPC .............................. 704/231; 704/235; 704/275

(58) Field of Classification Search
USPC .................................. 704/231, 235, 270–272
See application file for complete search history.

(56) References Cited

U.S. PATENT DOCUMENTS

| | | | | |
|---|---|---|---|---|
| 5,855,000 | A * | 12/1998 | Waibel et al. | 704/235 |
| 6,253,174 | B1 * | 6/2001 | Ishii et al. | 704/231 |
| 7,082,391 | B1 * | 7/2006 | Merrill | 704/231 |
| 7,872,574 | B2 * | 1/2011 | Betts et al. | 340/539.26 |
| 2005/0125224 | A1 * | 6/2005 | Myers et al. | 704/231 |
| 2005/0288932 | A1 * | 12/2005 | Kurzweil et al. | 704/260 |
| 2006/0265217 | A1 * | 11/2006 | Bicego et al. | 704/231 |
| 2007/0208561 | A1 * | 9/2007 | Choi et al. | 704/231 |
| 2008/0243507 | A1 * | 10/2008 | Gopinath et al. | 704/257 |

OTHER PUBLICATIONS

Mistry, Pranav et al., WUW—Wear Ur World—A Wearable Gesture Interface, CHI 2009—Spotlight on Works in Progress—Session 1, Apr. 4-9, 2009, Boston, MA US.

* cited by examiner

*Primary Examiner* — Douglas Godbold
(74) *Attorney, Agent, or Firm* — Toler Law Group, PC

(57) ABSTRACT

In one or more embodiments, one or more methods and/or systems described can perform producing a lattice of object hypotheses based on multiple reference objects from image information; receiving input speech information that includes a request for information associated with at least one reference object of the multiple reference objects; producing a lattice of speech hypotheses based on at least a first possible description included in the speech information; producing a lattice of scored semantic hypotheses based on at least the lattice of object hypotheses and the lattice of speech hypotheses; determining that a single semantic interpretation score of the lattice of scored semantic hypotheses exceeds a predetermined value; and providing requested information associated with the at least the first reference object of the plurality of reference objects.

20 Claims, 11 Drawing Sheets

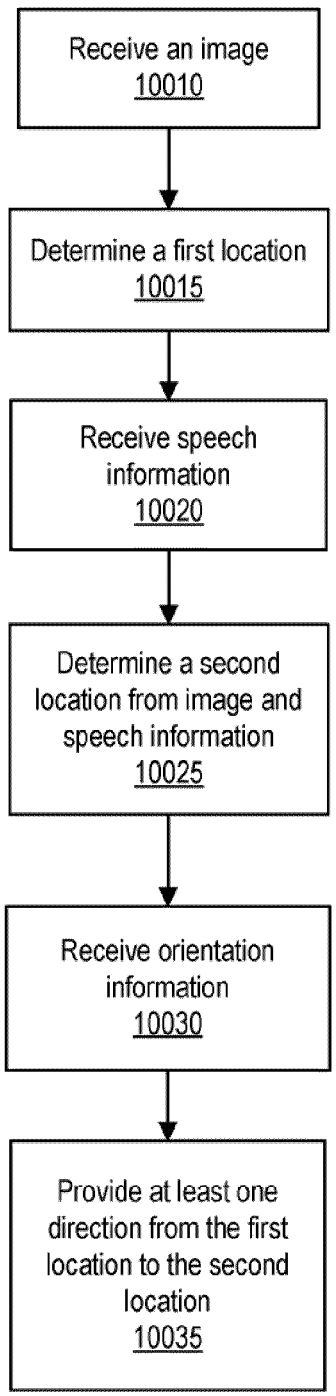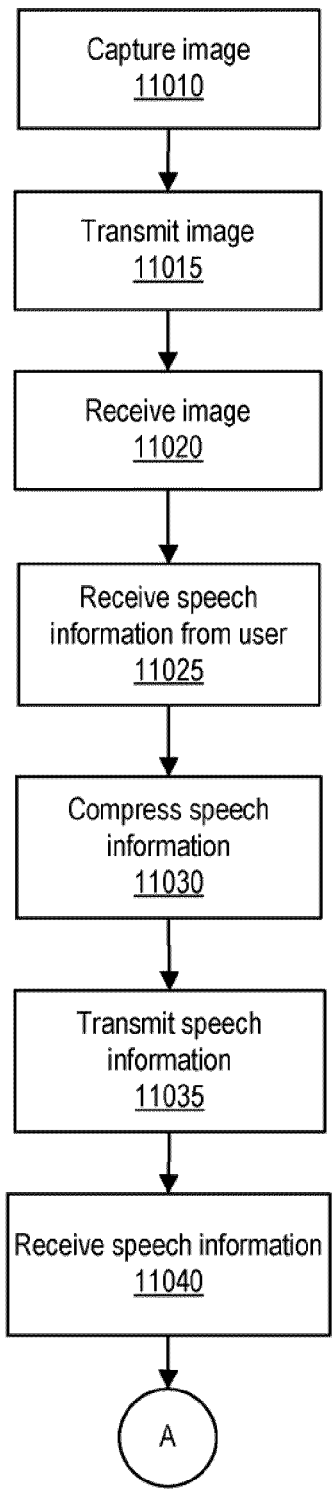
FIG. 10
FIG. 11

MULTIMODAL AUGMENTED REALITY FOR LOCATION MOBILE INFORMATION SERVICE

BACKGROUND

1. Technical Field

This disclosure relates generally to the field of locating one or more locations using a mobile device and, more specifically, this disclosure pertains to the field of locating one or more locations using an electronic image sensor of a mobile device.

2. Description of the Related Art

In the past, a user of a mobile device (e.g., mobile telephone, personal digital assistant, laptop, etc.) typically types in a location (e.g., a street address) of an automated teller machine, a restaurant, a store, a gas station, etc. and the mobile device locates itself using a global positioning system (GPS) receiver or a nearest access point communicating with the mobile device to provide directions to the location.

BRIEF DESCRIPTION OF THE DRAWINGS

The preferred embodiments will become apparent upon reading the following detailed description and upon reference to the accompanying drawings in which:

FIG. 10 illustrates a method for providing directions to a location, according to one or more embodiments; and FIGS. 11 and 12 illustrate a method for providing information about a reference object, according to one or more embodiments.

Figure 1:
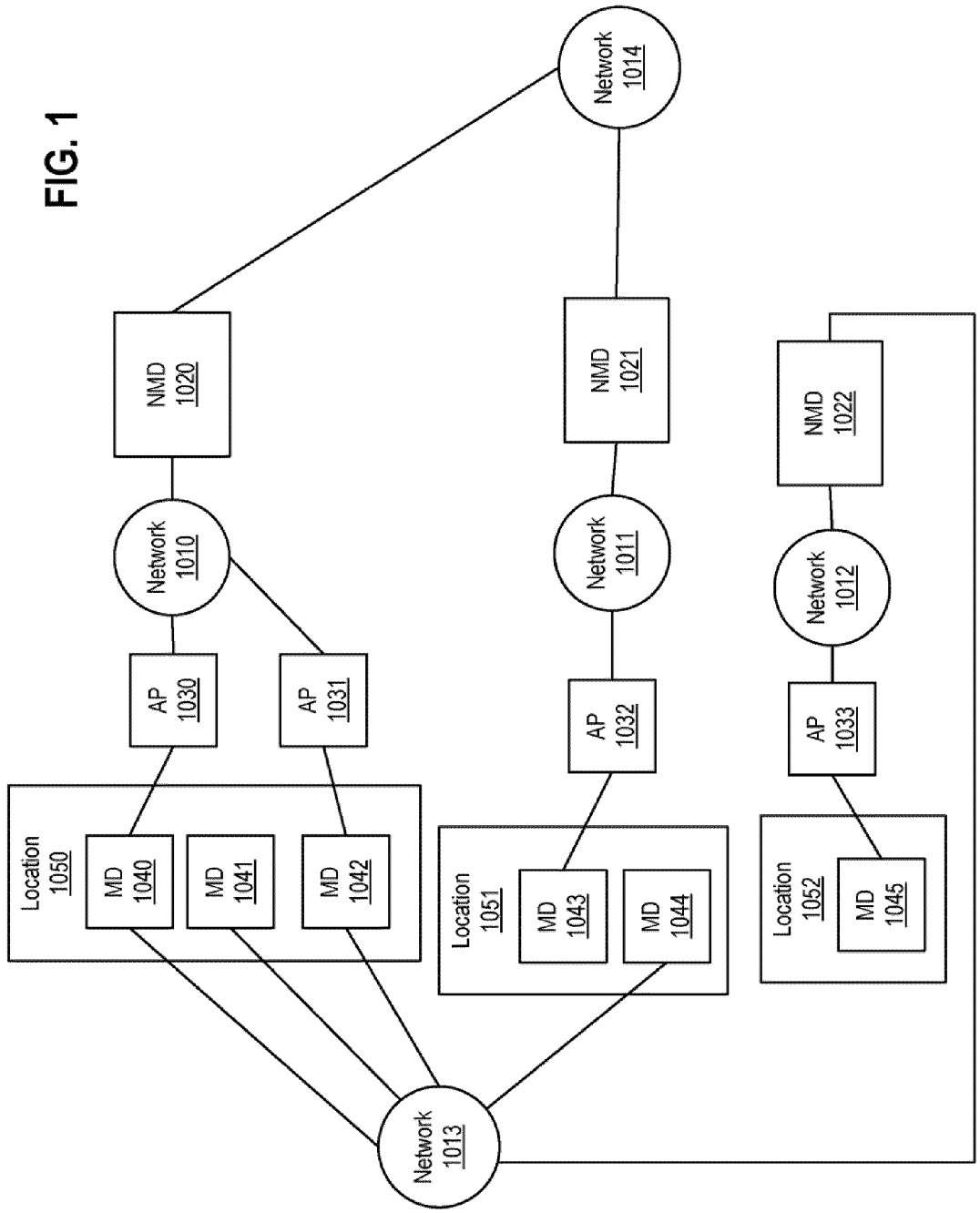
FIG. 1 provides a block diagram of a network communication system, according to one or more embodiments.

While the invention is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of an invention as defined by appended claims.

DETAILED DESCRIPTION

FIG. 1 illustrates a block diagram of one or more network communications systems, according to one or more embodiments. In one or more embodiments, mobile devices (MDs) 1040-1042 and 1044 can be coupled to and communicate with network 1013. For example, network 1013 can be and/or implement a telecommunications network. For instance, network 1013 can be and/or implement a wireless telecommunications network that can support one or more wireless telecommunications network protocols such as one or more of General Packet Radio Service (GPRS), enhanced data rates for GSM evolution (EDGE), long term evolution, (LTE), CDMA (code division multiple access), TDMA (time division multiple access), and/or FDMA (frequency division multiple access), among others. In one or more embodiments, network 1013 can be coupled to and/or include a telephony network that can include a wireless cellular telecommunications network and/or a wireless satellite telecommunications network. In one or more embodiments, the telephony network can communicate information such as voice and/or data.

In one or more embodiments, network 1013 can implement and/or provide access and/or services of one or more other networks. For example, network 1013 can provide access and/or services of a public network (e.g., the Internet) to one or more of MDs 1040-1042 and 1044. In one or more embodiments, network 1013 provides access and/or services of one or more other networks at a lower data rate than a network 1014 can provide to one or more of MDs 1040, 1042, and 1043. For example, network 1013 can include less bandwidth than network 1014. In one or more embodiments, network 1014 can provide access and/or services of one or more other networks to MDs 1040-1044 through one or more access points (APs) and/or one or more network management devices (NMDs).

In one or more embodiments, access to these networks can include one or more "services" these networks may provide. For example, these one or more services can include one or more of: email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and video, among others. In one or more embodiments, the one or more service can be associated with and/or correspond to one or more protocols of one or more computer and/or software applications.

As shown, MDs 1040-1042 can be at a location 1050, and mobile device (MD) 1040 can be coupled to an access point (AP) 1030. MD 1042 can be coupled to an AP 1031. As illustrated, APs 1030 and 1031 can be coupled to a network 1010 that can be coupled to a network management device (NMD) 1020. In one or more embodiments, MD 1040 can be coupled to network 1010 via AP 1030, and MD 1042 can be coupled to network 1010 via AP 1031. In one or more embodiments, network 1010 can be coupled to network 1014 via NMD 1020.

In one or more embodiments, NMD 1020 can provide authentication, quality of service (QoS), communication traffic shaping, and/or access control from one or more computing devices (e.g., MDs 1040 and 1042) coupled to network 1010 through one of APs 1030 and 1031 to network 1014. For example, NMD 1020 can include an access control list that can be modifiable, and NMD 1020 can use the access control list to permit and/or deny access of one or more computing devices (e.g., MDs 1040 and 1042) to network 1014. In one or more embodiments, NMD 1020 can perform one or more processes and/or methods that can modify the access control list. In one or more embodiments, NMD 1020 can receive one or more signals from a remote signaling device, and the access control list of NMD 1020 can be modified based on the received one or more signals from the remote signaling device. In one or more embodiments, signals and/or signaling can be used in communicating establishment and/or control of communications and/or access to a network and/or resources of the network. In one or more embodiments, signals and/or signaling can be used between two different network providers or between two systems of a single network provider. In one example, a first network provider can be or include a second network provider, and signals and/or signaling can be used between the first network provider and the second network provider can mean signaling between two systems of the first network provider. In one or more embodiments, signals and/or signaling can be used to convey information (e.g., configuration messages, accounting messages, control data, etc.) that is different than user information transfer (e.g., a telephone conversation between two users, a text message communication between two users, etc.).

In one or more embodiments, network 1010 and/or network 1014 can include a wired network, a wireless network or a combination of wired and wireless networks. Network 1010 and/or network 1014 can include and/or be coupled to various types of communications networks, such as a public switched telephone network (PSTN), an Internet, a wide area network (WAN) (e.g., a private WAN, a corporate WAN, a public WAN, etc.), a local area network (LAN). In one or more embodiments, NMD 1020 can be coupled to a PSTN, e.g., Ethernet cable and DSL; a cable (television) based network; a satellite-based system; and/or a fiber based network; among others. In one or more embodiments, network 1010 and/or network 1014 can include one or more wireless networks, e.g., based on IEEE 802.11 and/or IEEE 802.16. For instance, one or more of APs 1030 and 1031 can be coupled to network 1010 in a wireless fashion. Network 1010 and/or network 1014 can include one or more DSL (digital subscriber line) and/or cable (e.g., cable television) networks and/or infrastructures. For example, network 1010 and/or network 1014 can include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In one or more embodiments, network 1014 may form part of the Internet, or may couple to other networks, e.g., other local or wide area networks such as the Internet. In one or more embodiments, NMD 1020 can be a system operable to include one or more of network 1010, AP 1030, AP 1031, and/or various networking equipment, among others.

In one or more embodiments, AP 1030 can be a wired AP or a wireless AP. In one example, a wired AP can communicate with one or more computing devices (e.g., MDs 1040-1045) in a wired fashion. For instance, a wired AP can communicate with one or more computing devices (e.g., MDs 1040-1045) using wired Ethernet. In another example, a wireless AP communicate with one or more computing devices (e.g., MDs 1040-1045) in a wireless fashion. For instance, a wired AP can communicate with one or more computing devices (e.g., MDs 1040-1045) using one or more of Institute of Electrical and Electronics Engineers (IEEE) 802.16, IEEE 802.11 (wireless Ethernet), IEEE 802.15 (Bluetooth), ultra wide band, and/or infrared communication technologies, among others. In one or more embodiments, a wireless access point can include a transceiver to communicate with one or more computing devices using one or more wireless methods, processes, and/or protocols.

In one or more embodiments, each mobile device (MD) of MDs 1040-1045 can include and/or can be coupled to one or more transceivers that allow the MD to communicate with network 1013 and/or an AP of APs 1030-1033. For example, MD 1040 can include or be coupled to a first transceiver that can communicate with network 1013 and/or include or be coupled to a second transceiver to communicate with AP 1030. For instance, MD 1040 can include or be coupled to a first transceiver that can communicate with a cellular telephone tower of or coupled to network 1013 and/or include or be coupled to a second transceiver, such as a wireless Ethernet transceiver, to communicate with AP 1030.

As shown, MDs 1043 and 1044 can be at a location 1051, and MD 1043 can be coupled to an AP 1032 which can be coupled to a network 1011 that can be coupled to a NMD 1021. As also shown, MD 1045 can be at a location 1052 and can be coupled to an AP 1033 which can be coupled to a network 1012 that can be coupled to a NMD 1022. As illustrated, network management devices (NMDs) 1020 and 1021 can be coupled to network 1014, and NMD 1022 can be coupled to network 1013. In one or more embodiments, NMDs 1020 and 1021 can provide access control between respective networks 1010 and 1011 and network 1014, and NMD 1022 can provide access control between networks 1012 and network 1013. In one or more embodiments, NMDs 1021 and 1022 can include and/or implement one or more structures and/or one or more functionalities described with reference to NMD 1020. In one or more embodiments, APs 1031-1033 can include and/or implement one or more structures and/or one or more functionalities described with reference to AP 1030. In one or more embodiments, networks 1011 and 1012 can include and/or implement one or more structures and/or one or more functionalities described with reference to network 1010. In one or more embodiments, locations 1050-1052 can include one or more of streets, hotels, airports, restaurants, geographic regions, planes, trains, automobiles, and coffee shops, among others.

Figure 2:
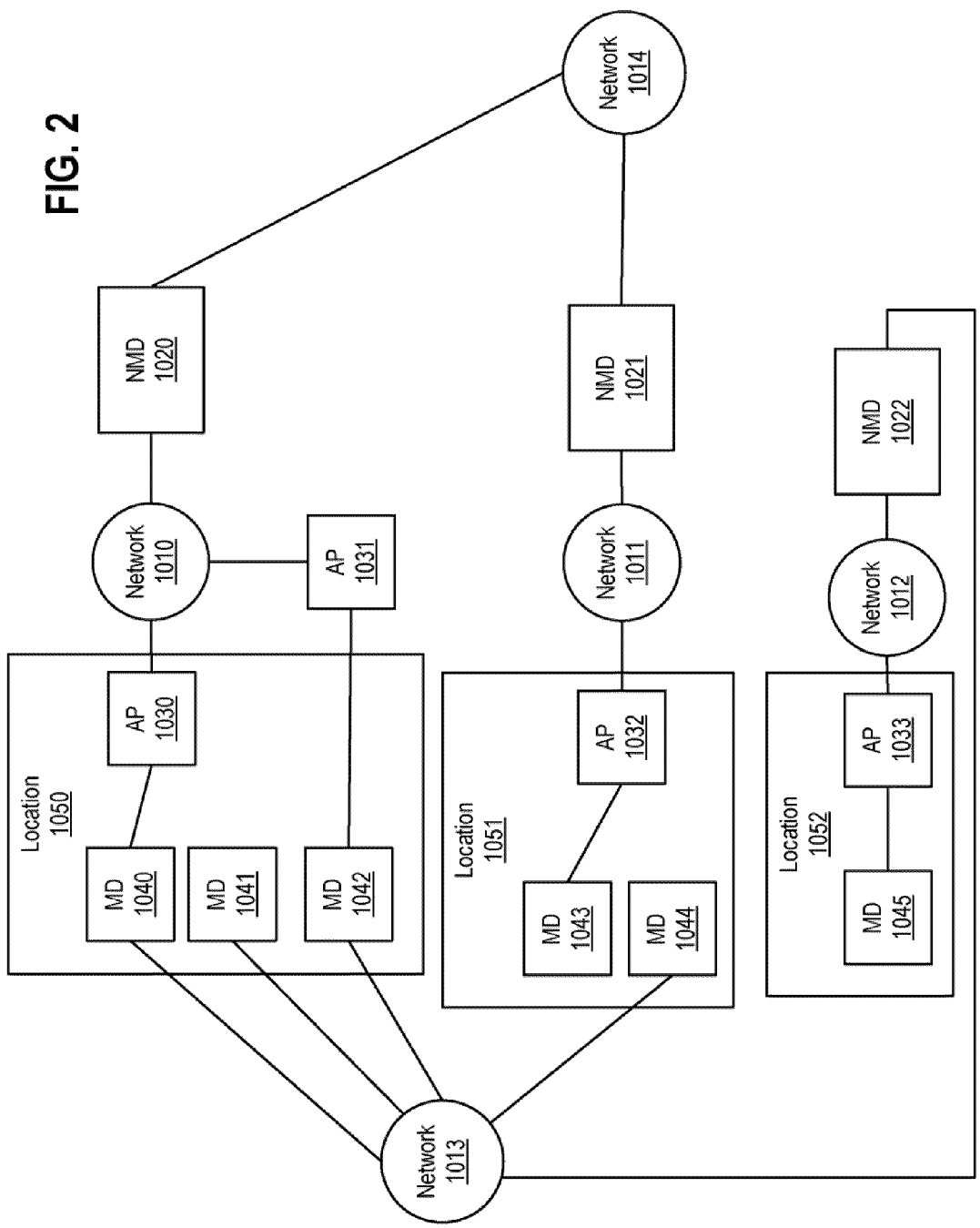
FIG. 2 provides a block diagram of a network communication system, according to one or more embodiments.

Turning now to FIG. 2, a block diagram of one or more network communications systems is illustrated, according to one or more embodiments. Each of the elements illustrated in FIG. 2 is described with reference to FIG. 1. As illustrated, APs 1030, 1032, and 1033 can be at respective locations 1050, 1051, and 1052. In one or more embodiments, one or more locations of one or more of APs 1030-1033 can be stored in a database, and a location of a computing device coupled to an AP can determined using the location of the AP. For example, AP 1030 may have a limited range in which a computing device can communicate with AP 1030. For instance, AP 1030 may communicate with a computing device using wireless Ethernet which may be limited to communicating with the computing device when the computing device is within some number (e.g., tens or hundreds) of feet. For example, the database can store a location associated with location 1050 for AP 1030, and the location associated with location 1050 can be used to determine one or more locations for one or more of MDs 1040 and 1041 communicating with AP 1030. For instance, if MD 1040 is communicating with AP 1030, then it can be determined that MD 1040 is at location 1050.

In one or more embodiments, location 1052 can be or be included in a vehicle. For example, location 1052 can be or be included in a plane, train, or automobile, and location 1052 can move from one point to another point at one or more speeds and/or directions. For instance, location 1052 can be or be included in a cabin of a plane, a train car, or a passenger car.

Figure 3:
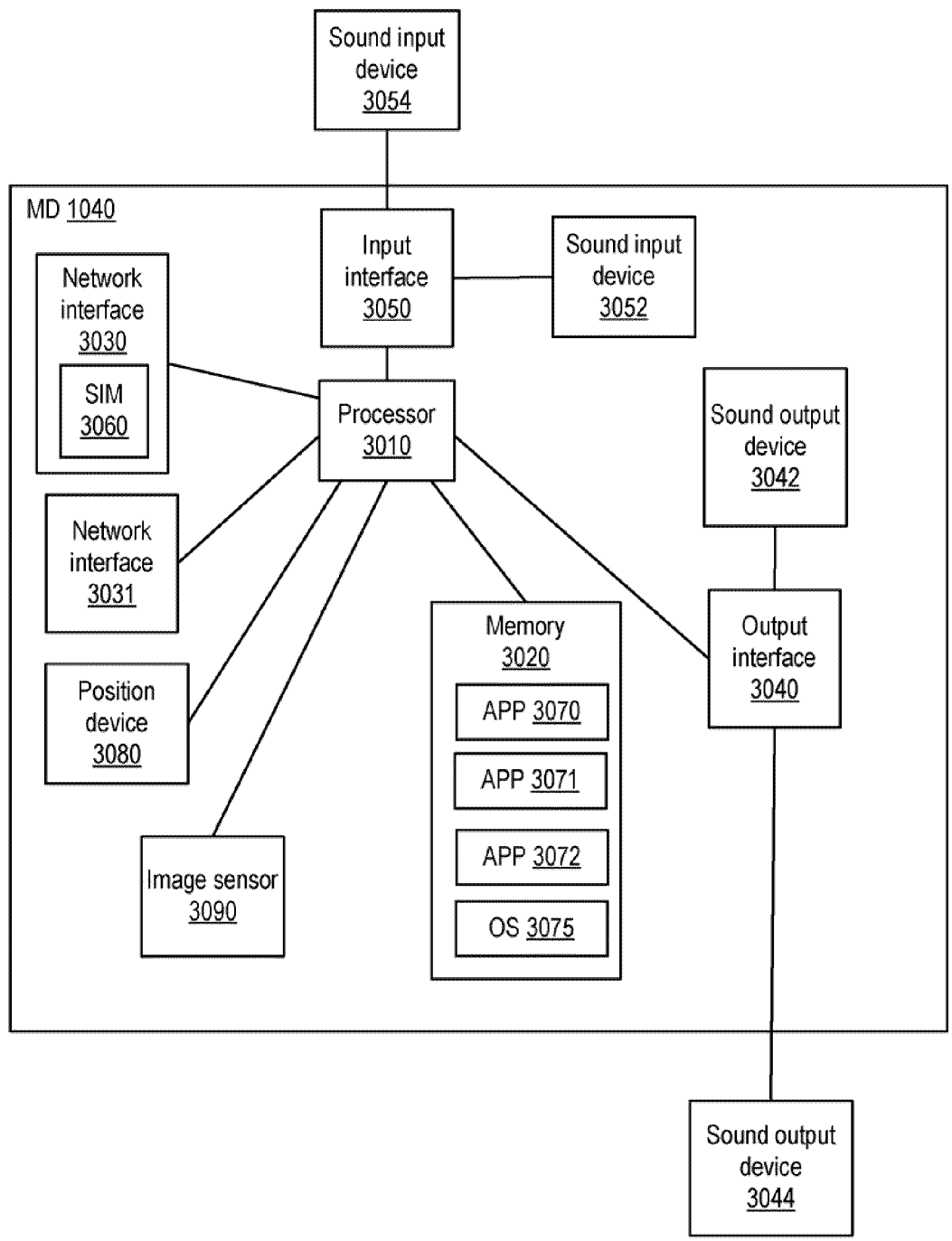
FIG. 3 provides a block diagram of a mobile device, according to one or more embodiments.

Turning now to FIG. 3, a block diagram of a mobile device is illustrated, according to one or more embodiments. As shown, MD 1040 can include a memory 3020 coupled to a processor 3010, and MD 1040 can include network interfaces 3030 and 3031, a user output interface 3040, a user input interface 3050, a position device 3080, and an image sensor 3090 coupled to processor 3010. In one or more embodiments, memory 3020 can include one or more applications (APPs) 3070-3072 and/or operating system (OS) 3075 that can include instructions executable by processor 3010 to implement one or more methods and/or one or more systems associated with MD 1040. In one or more embodiments, MD 1040 may be any of various types of devices, including a computer system, such as a portable computer, a personal digital assistant (PDA), a mobile telephone (e.g., a cellular telephone, a satellite telephone, etc.), a wearable computing device, an Internet appliance, a communications device, a handheld mobile computing device, or other wired or wireless device. In one or more embodiments, processor 3010 can include one or more cores, and each core of processor 3010 can implement an instruction set architecture (ISA).

In one or more embodiments, user output interface 3040 can be used to convey information (e.g., text, graphic, video, haptic, audio, etc.) to a user of MD 1040. For example, MD 1040 may include a display (e.g., a display screen) that can be used to convey text, graphic, image, motion picture, and/or video information to a user of MD 1040. In one or more embodiments, MD 1040 can include a sound output device 3042 coupled to user output interface 3040. In one or more embodiments, sound output device 3042 can include a device and/or circuitry that can produce one or more sounds.

In one or more embodiments, user output interface 3040 can be coupled to a sound output device 3044. In one instance, sound output device 3044 can include one or more of an amplifier and/or a speaker. In another instance, sound output device 3044 can include one or more earphones. In one or more embodiments, user output interface 3040 can be coupled to sound output device 3044 in a wired fashion. In one or more embodiments, user output interface 3040 can be coupled to sound output device 3044 in a wireless fashion. In one example, user output interface 3040 can communicate sound information to output device 3044 using an ISM (industrial, scientific, measurement) band. For instance, user output interface 3040 can communicate sound information to sound output device 3044 using one or more of a personal are network (PAN), IEEE 802.15, IEEE 802.15.4, ZigBee, 6LoWPAN, frequency modulation of a carrier wave, amplitude modulation of a carrier wave, light signals, and serial pulses, among others. In one or more embodiments, sound output device 3044 can be or be included in a device that includes an IEEE 802.15 receiver or transceiver, such as a Bluetooth headset or earpiece.

In one or more embodiments, user input interface 3050 can be used to receive sounds from a user of MD 1040. In one example, MD 1040 can include a sound input device 3052 coupled to user input interface 3050. In one instance, sound input device 3052 can include a microphone. In another example, a sound input device 3054 coupled to user input interface 3050. In one or more embodiments, a sound input device can include a device and/or circuitry that can receive one or more sounds and transform the one or more sounds into one or more electrical signals (e.g., voltage and/or current). In one or more embodiments, a sound input device can include an acoustic to electric transducer or sensor that can convert one or more sounds into one or more electrical signals. For example, the acoustic to electric transducer or sensor can include a body (e.g., a diaphragm, a crystal, a ceramic, etc.) that can vibrate in response to one or more sounds (e.g., in response to sound pressure), and movement of the body can be transformed and/or converted into one or more electrical signals. For instance, a sound input device can include a microphone. In one or more embodiments, a microphone can use one or more of capacitance change (e.g., a condenser microphone), electromagnetic induction (e.g., a dynamic microphone), piezoelectric generation, and light modulation to produce one or more electrical signal from one or more mechanical vibrations.

In one or more embodiments, user input interface 3050 can be coupled to sound input device 3054 in a wired fashion. In one or more embodiments, user input interface 3050 can be coupled to sound input device 3054 in a wireless fashion. In one example, user input interface 3050 can communicate sound information to sound input device 3054 using an ISM band. For instance, sound input device 3054 can communicate sound information to user input interface 3050 using one or more of a PAN, IEEE 802.15, IEEE 802.15.4, ZigBee, 6LoWPAN, frequency modulation of a carrier wave, amplitude modulation of a carrier wave, light signals, and serial pulses, among others. In one or more embodiments, sound input device 3054 can be or be included in a device that includes an IEEE 802.15 transmitter or transceiver, such as a Bluetooth headset or microphone.

In one or more embodiments, user input interface can be used to receive user input from a user of MD 1040. In one example, MD 1040 may include a keyboard that can be used to receive user input from a user of MD 1040. In another example, MD 1040 may include one or more sensors that can be used to receive user input from a user of MD 1040. In one instance, one or more sensors can include resistive sensors that can be used to determine one or more positions on a display screen. In another instance, one or more sensors can include capacitive sensors that can be used to determine one or more positions on a display screen. In one or more embodiments, user output interface 3040 and user input interface 3050 can be used to implement a keyboard. For example, user output interface 3040 can be used to present an image of a keyboard, and user input interface 3050 can receive a position of user input on the image of the keyboard to determine a received key of the keyboard.

In one or more embodiments, network interface 3030 can include a transceiver that is operable to communicate information with network 1013. In one or more embodiments, network interface 3030 can be used to couple MD 1040 to network 1013, and MD 1040 can use network interface 3030 to communicate information (e.g., data, voice data, etc.) with network 1013. In one or more embodiments, network interface 3030 can include a subscriber identity module (SIM) 3060. In one or more embodiments, SIM 3060 can securely store an international mobile subscriber identity (IMSI) which can include a unique number and/or identity associated with a global system for mobile communications (GSM) network and/or a universal mobile telecommunications system (UMTS) network. In one example, the unique number and/or identity can be used to determine information corresponding to MD 1040 from a home location register (HLR) and/or from a visitor location register (VLR). In one or more embodiments, a MSISDN (mobile subscriber ISDN (integrated services digital network) number, mobile station international ISDN number(s), or mobile international ISDN number) can be a number that can uniquely identify a subscription in a GSM mobile network and/or a UMTS (universal mobile telecommunications system) mobile network. For example, the MSISDN can include a telephone number corresponding to SIM 3060. In one instance, the MSISDN can include a country code, a national destination code, and a subscriber number. In another instance, the MSISDN can include a country code, a number planning area, and a subscriber number.

In one or more embodiments, SIM 3060 can be embodied in a removable card (e.g., a SIM card) that can be removed from a first MD associated with a first subscriber account and placed in a second MD, so that the second MD can be associated with the first subscriber account. For example, SIM 3060 embodied as a SIM card can be associated with a first subscriber account and used in MD 1040, thereby associating MD 1040 with the first subscriber account; SIM 3060 can be removed from MD 1040, thereby disassociating MD 1040 with the first subscriber account; and SIM 3060 can be placed in MD 1045, thereby associating MD 1045 with the first subscriber account.

In one or more embodiments, network interface 3031 can be used to communicate with AP 1030. In one example, network interface 3031 can be configured and used to communicate with AP 1030 in a wired fashion, and in another example, network interface 3031 can be configured and used to communicate with AP 1030 in a wireless fashion. In one or more embodiments, network interface 3031 can include a transceiver that is operable to communicate information with AP 1030.

In one or more embodiments, MD 1040 can include a position device 3090 coupled to processor 3010. In one example, position device 3090 can include a global positioning system (GPS) receiver. In another example, position device 3090 can include a terrestrial radio navigation system receiver such as LORAN (LOng RAnge Navigation). In one or more embodiments, position device 3090 can provide one or more services such as one or more of positioning, navigation, and timing to processor 3010. For example, a positioning service can provide one or more of latitude information, longitude information, altitude information, and accuracy information (e.g., a radius of uncertainty for a geographic location or position).

In one or more embodiments, position device 3080 can provide heading information. For example, position device 3080 can include a compass and/or implement a compass to provide heading information. In one or more embodiments, position device 3080 can provide device position information such as tilt and/or angle information. For example, position device 3080 can include one or more of an accelerometer and an electronic gyroscope. In one or more embodiments, the compass can be electronically gimbaled using one or more of an accelerometer and an electronic gyroscope.

In one or more embodiments, electronic image sensor 3090 can provide digital data of one or more of an image, a motion picture, and a video. For example, electronic image sensor 3090 can be or include a digital camera. In one or more embodiments, the digital data of one or more of an image, a motion picture, and a video can include one or more formats. For example the one or more formats can include one or more of a tagged image file format (TIFF), a joint photographic experts group (JPEG) format, an exchangeable image file format (EXIF), a RAW format, a portable network graphics (PNG) format, a graphic interchange format (GIF), a bitmap (BMP) format, and a vector file format, among others.

Figure 4:
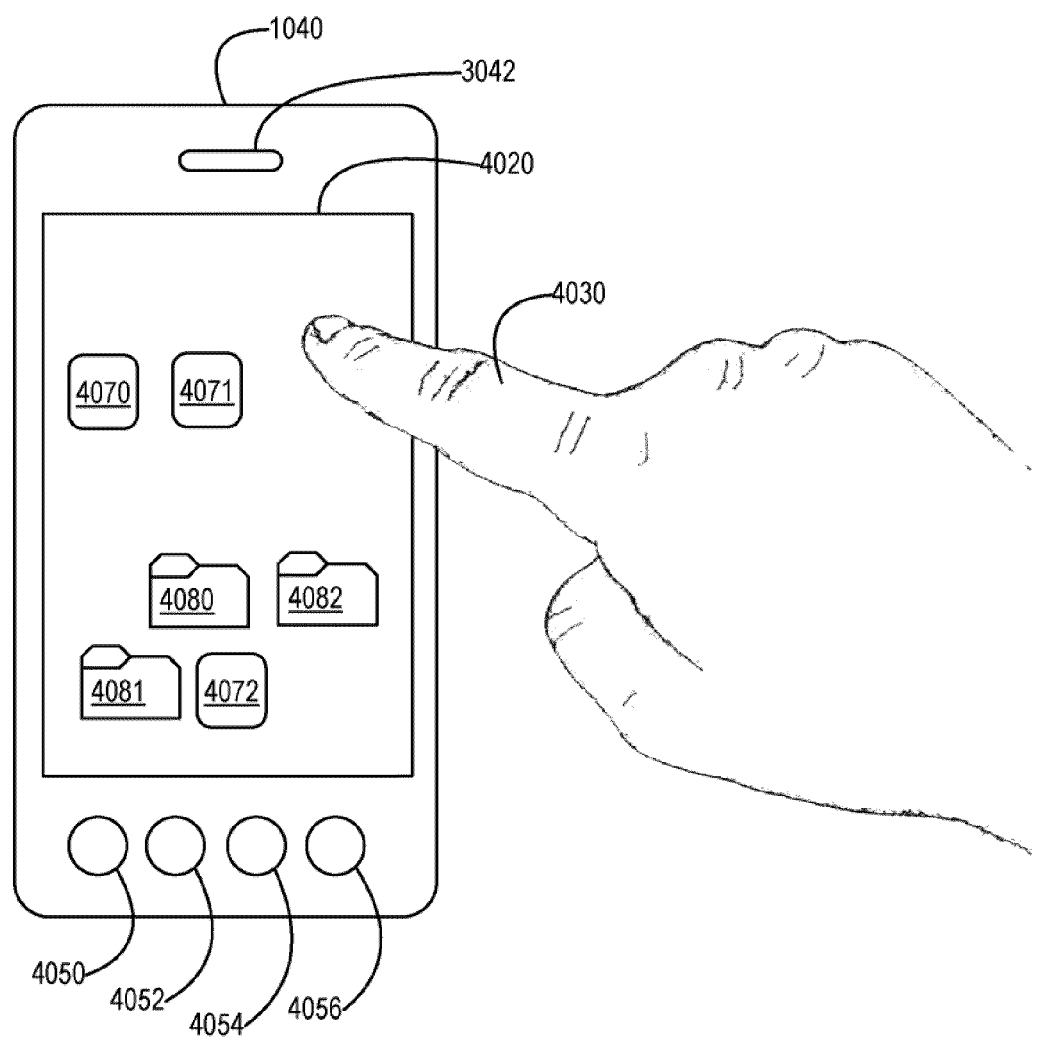
FIG. 4 provides a block diagram of a mobile device and a portion of a user of the mobile device, according to one or more embodiments.

Turning now to FIG. 4, a diagram of a mobile device and a portion of a user of the mobile device are illustrated, according to one or more embodiments. As shown, MD 1040 can include one or more user selectable buttons 4050-4056. In one or more embodiments, buttons 4050-4056 can be coupled to input interface 3050. MD 1040 can include a touch screen 4020 that can be coupled to output interface 3040 and input interface 3050. As illustrated, icons 4070-4082 can be displayed by touch screen 4020. In one or more embodiments, one or more of icons 4070-4082 can be selected by a digit (e.g., a finger) 4030 or other appendage of a user of MD 1040 and/or one or more of icons 4070-4082 can be selected by a stylus (not shown). In one or more embodiments, icons 4070-4072 can represent applications (e.g., applications 3070-3072) and icons 4080-4082 can represent folders (e.g., folders or directories of a file system).

In one or more embodiments, digit 4030 can drag an icon of icons 4070-4082 from a first portion of screen 4020 by selecting the icon, moving digit 4030 to a second portion of screen 4020, and removing digit 4030. In one example, digit 4030 can be kept in contact with screen 4020 or in close proximity to screen 4020 while dragging the icon. In another example, digit 4030 can select the icon, be removed from screen 4030, and select a portion of screen 4030. In one or more embodiments, digit 4030 can drag an icon of icons 4070-4072 to an icon of folder icons 4080-4082. In one or more embodiments, a drag and drop process can include dragging a first icon associated with a file or application to a second icon associated with a folder. In one or more embodiments, an icon of icons 4070-4072 can be selected by digit 4030 to execute a corresponding application of applications 3070-3072. For example, digit 4030 can single or double tap icon 4071 and APP 3071 can be executed by processor 3010.

Figure 5:
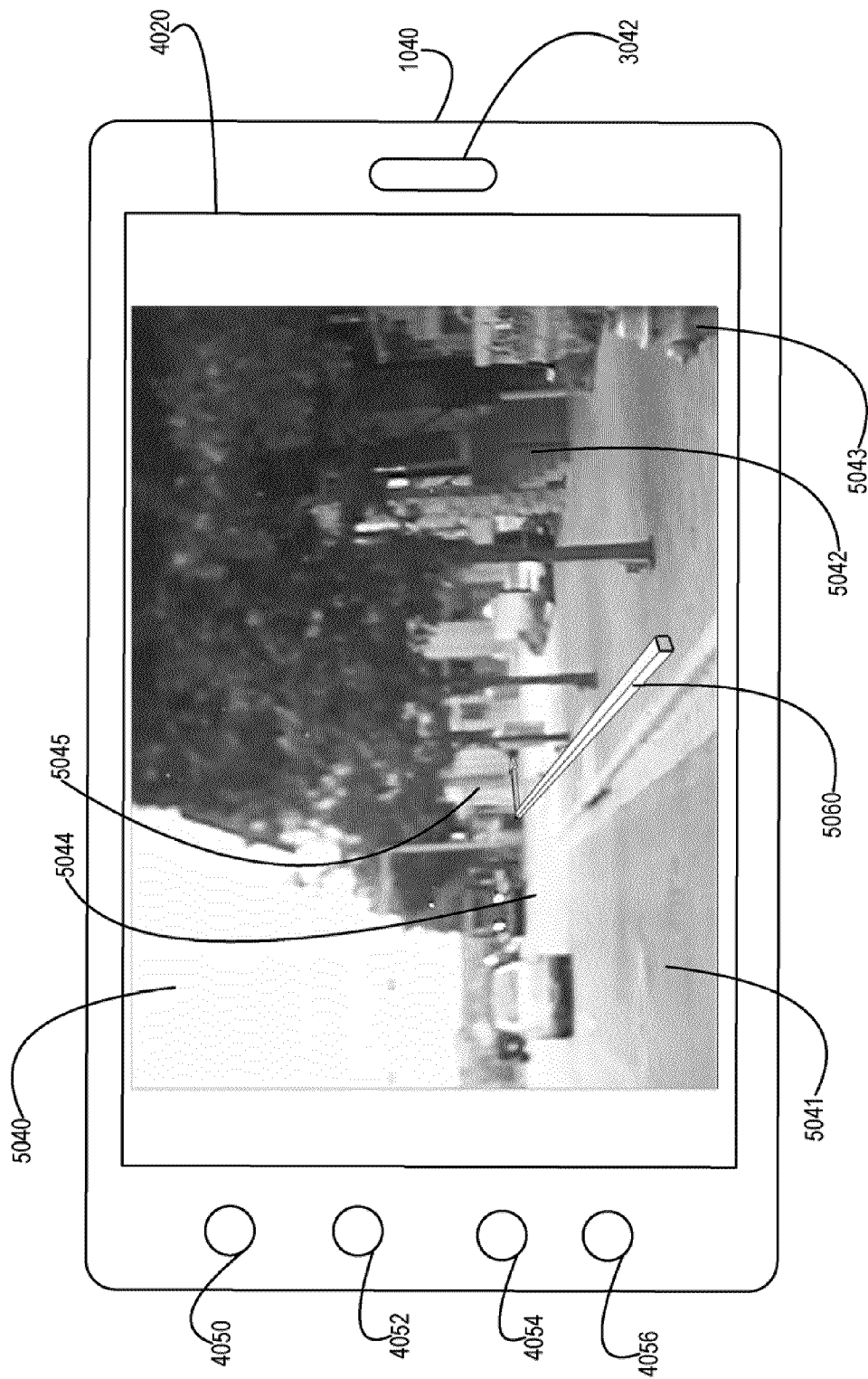
FIG. 5 provides a diagram of a mobile device displaying an image and an overlay pointer indicating at least one direction, according to one or more embodiments.

Turning now to FIG. 5, a diagram of a mobile device identifying and displaying an image is illustrated, according to one or more embodiments. As shown, touch screen 4020 can display an image 5040. In one or more embodiments, image 5040 can be acquired via image sensor 3090 of MD 1040. As illustrated, overlay pointer 5060 can be displayed over image 5040. In one or more embodiments, overlay pointer 5060 can be displayed over image 5040 in response to a request (e.g., via text, via speech, etc.) from a user of MD 1040. In responding to the request, one or more reference objects 5041-5045 can be identified to determine a first location, and a second location (e.g., restaurant, coffee shop, restroom, shop, bank, automated teller machine, drug store, café, bus stop, etc.) can be determined from the request. In one example, one or more of street 5041, stairs 5042, hydrant 5043, street 5044, and building 5045 can be identified to determine the first position or location. Overlay pointer 5060 can be displayed from the determined first location to indicate one or more directions to the second location. As illustrated, overlay pointer can provide directions of forward and to the right at the street corner. In one or more embodiments, image sensor 3090 can provide two or more images over a period of time (e.g., a motion picture, a video, etc.), and overlay pointer 5060 can be updated to provide one or more directions to the second location.

Figure 6:
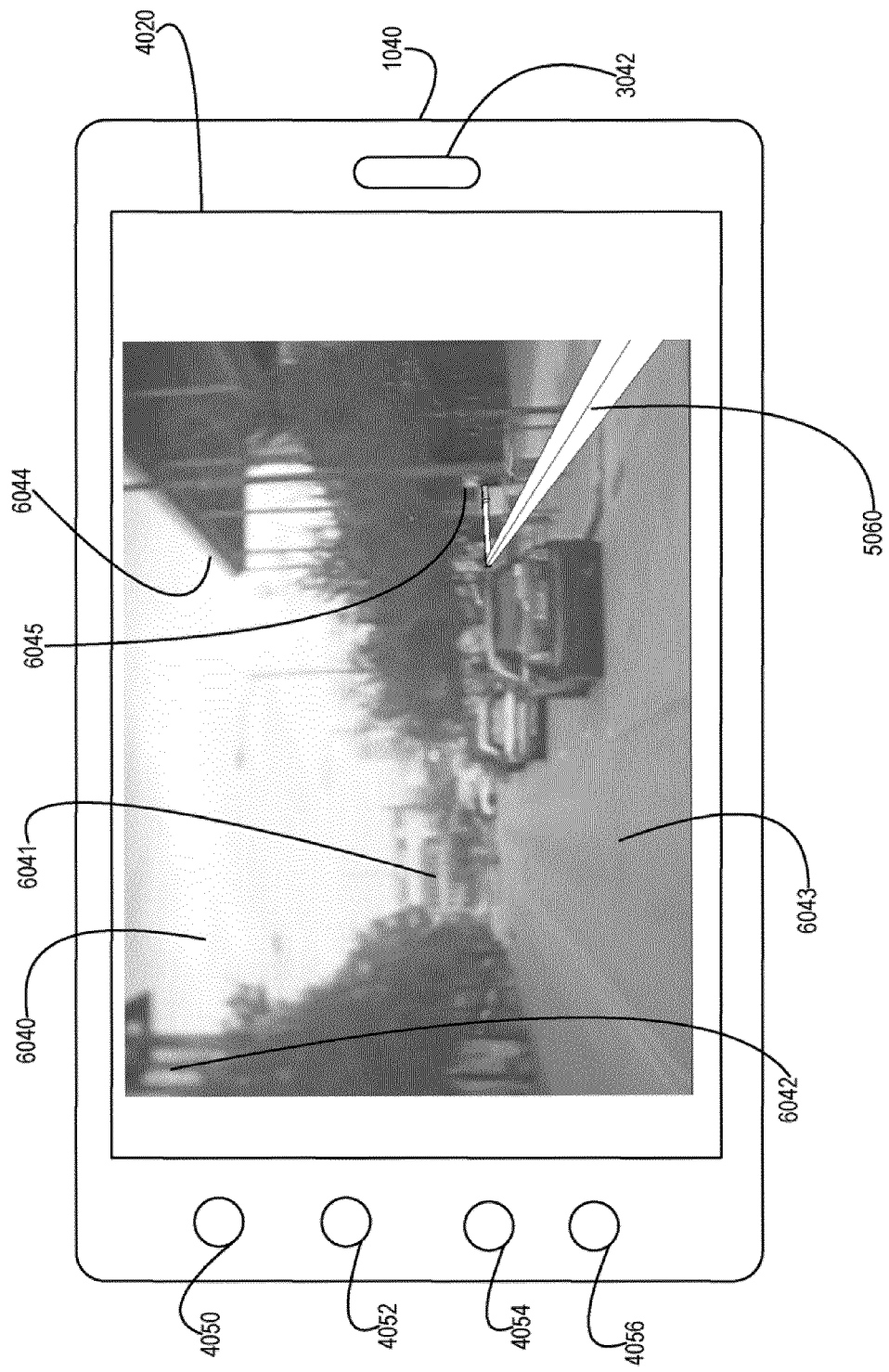
FIG. 6 provides a diagram of a mobile device displaying an image and an overlay pointer indicating at least one direction to a location, according to one or more embodiments.

Turning now to FIG. 6, a diagram of a mobile device identifying and displaying an image is illustrated, according to one or more embodiments. As shown, touch screen 4020 can display an image 6040. In one or more embodiments, image 6040 can be acquired via image sensor 3090 of MD 1040. As illustrated, overlay pointer 5060 can be displayed over image 6040. In one or more embodiments, overlay pointer 5060 can be displayed over image 6040 in response to a request (e.g., via text, via speech, etc.) from a user of MD 1040. For example, overlay pointer 5060 can be displayed over image 6040 in response to the request discussed above in reference to FIG. 5, and overlay pointer 5060 provides one or more directions to the second location. In one or more embodiments, a current location can be determined by identifying one or more reference objects 6041-6044. For example, one or more of building 6041, building 6042, street 6043, and building 6044 can be identified to determine the current location. As shown, overlay pointer 5060 can provide one or more directions from the current location to the second location (e.g., location 6045). In one or more embodiments, image sensor 3090 can provide two or more images over a period of time (e.g., a video, motion picture, etc.), and overlay pointer 5060 can be updated to provide one or more directions to location 6045.

Figure 7:
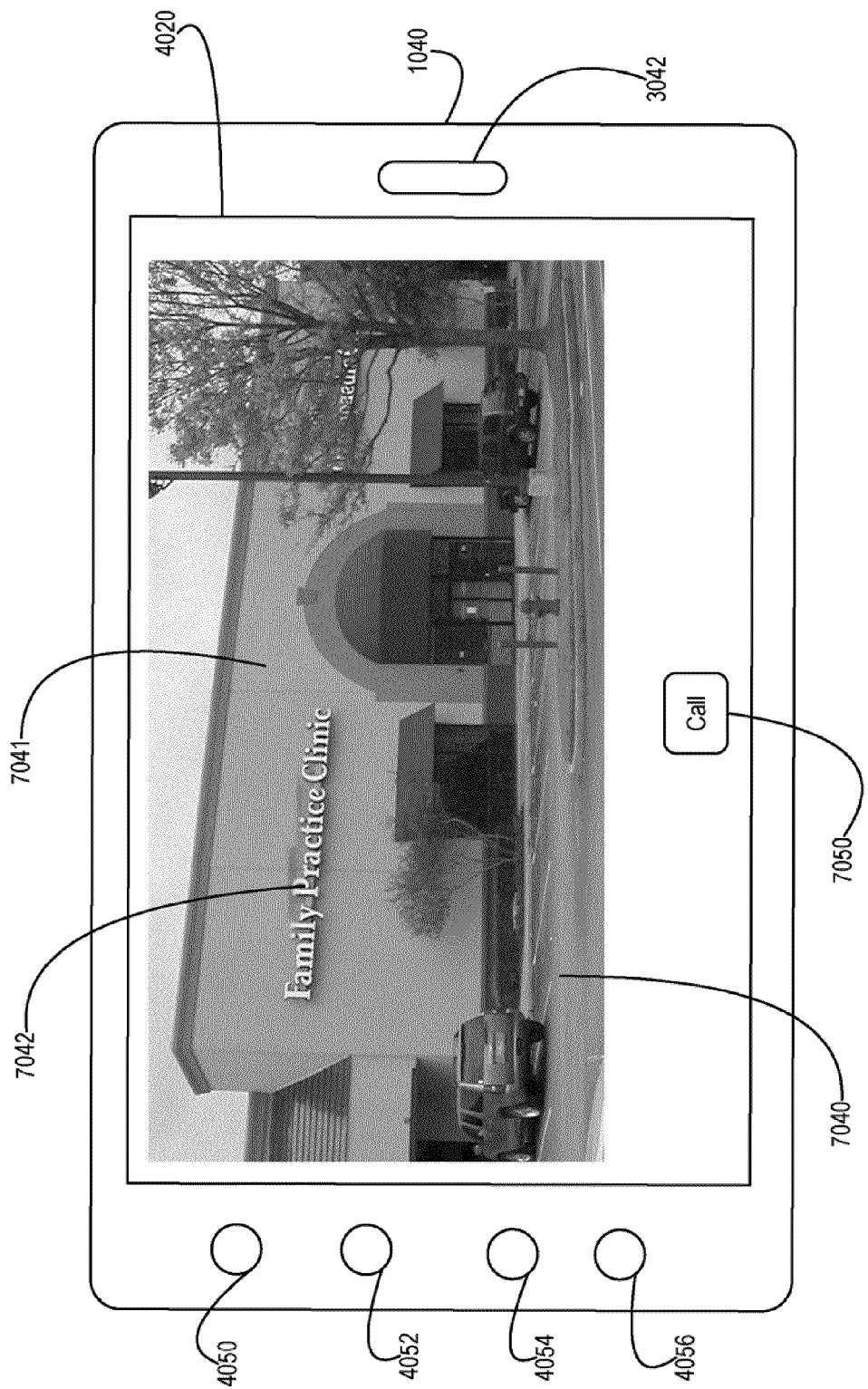
FIG. 7 provides a diagram of a mobile device displaying an image of a doctor's office, according to one or more embodiments.

Turning now to FIG. 7, a diagram of a mobile device identifying an image is illustrated, according to one or more embodiments. As shown, an image 7040 can be displayed by touch screen 4020. In one or more embodiments, image 7040 can be acquired via image sensor 3090 of MD 1040. In one or more embodiments, one or more reference objects 7041 and 7042 can be identified to identify image 7040. For example, image 7040 can be identified as an image of a doctor's office. In one instance, building 7041 can be identified to identify image 7040 as an image of a doctor's office. In another instance, sign, lettering, or string 7042 can be identified to identify image 7040 as an image of a doctor's office. In one or more embodiments, a user of MD 1040 can select icon 7050 to place a telephone call the identified doctor's office. In one or more embodiments, a user of MD 1040 can speak a request to place a call to the identified doctor's office. In one or more embodiments, a reference object can be selected (e.g., single or doubled tapped, etc.) to indicate a selection, and MD 1040 can receive speech information from a user of MD 1040 indicating to place a call to the selection. For example, a user of MD 1040 can select a reference object of reference objects 7041 and 7042 and speak "Call this place." In one instance, in response to receiving the selection and the speech information, MD 1040 can place a call to the identified doctor's office.

Figure 8:
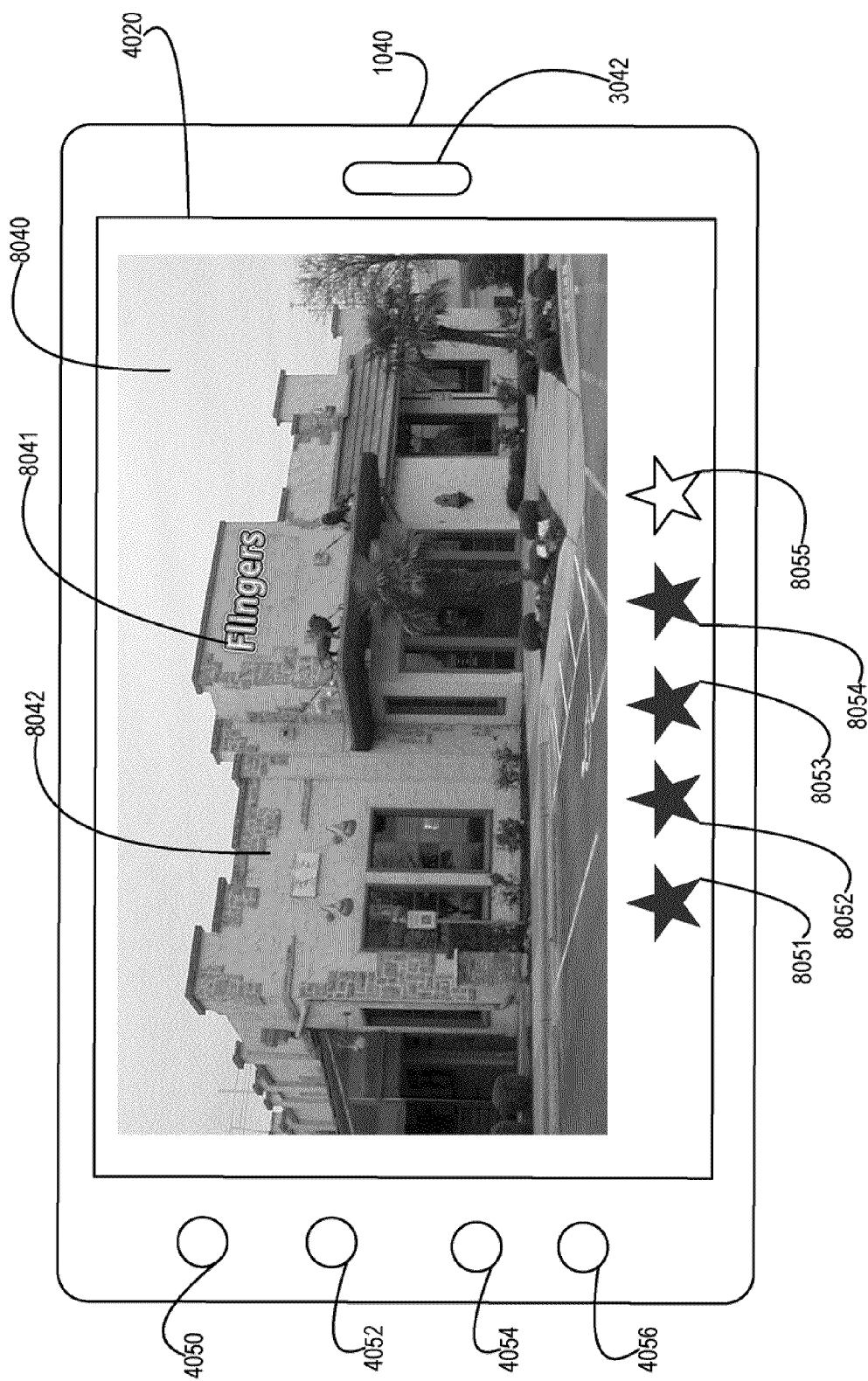
FIG. 8 provides a diagram of a mobile device displaying an image of a restaurant, according to one or more embodiments.

Turning now to FIG. 8, a diagram of a mobile device identifying an image is illustrated, according to one or more embodiments. As shown, an image 8040 can be displayed by touch screen 4020. In one or more embodiments, image 8040 can be acquired via image sensor 3090 of MD 1040. In one or more embodiments, one or more reference objects 8041 and 8042 can be identified to identify image 8040. For example, image 8040 can be identified as an image of a restaurant. In one instance, building 8042 can be identified to identify image 8040 as an image of a restaurant. In another instance, sign, lettering, or string 8041 can be identified to identify image 8040 as an image of a restaurant.

After identifying image 8040 as an image of a restaurant, one or more of a review of the restaurant, a menu of the restaurant, and a rating of the restaurant can be displayed by touch screen 4020. In one or more embodiments, one or more of the review of the restaurant, the menu of the restaurant, and the rating of the restaurant the rating can be displayed in response to a spoken request, from a user of MD 1040, for information about the restaurant. As shown, rating stars 8051-8055 can indicate a rating of the identified restaurant. For example, the identified restaurant can be associated with a rating of four out of five stars. As illustrated, stars 8051-8054 are shaded and star 8055 is not shaded to indicate the rating of four out of five stars. In one or more embodiments, the rating can be determined from reviews from one or more mobile user who have dined at the restaurant. In one or more embodiments, the rating can be determined from reviews from one or more of food critics, magazines, newspapers, and other publications.

Figure 9:
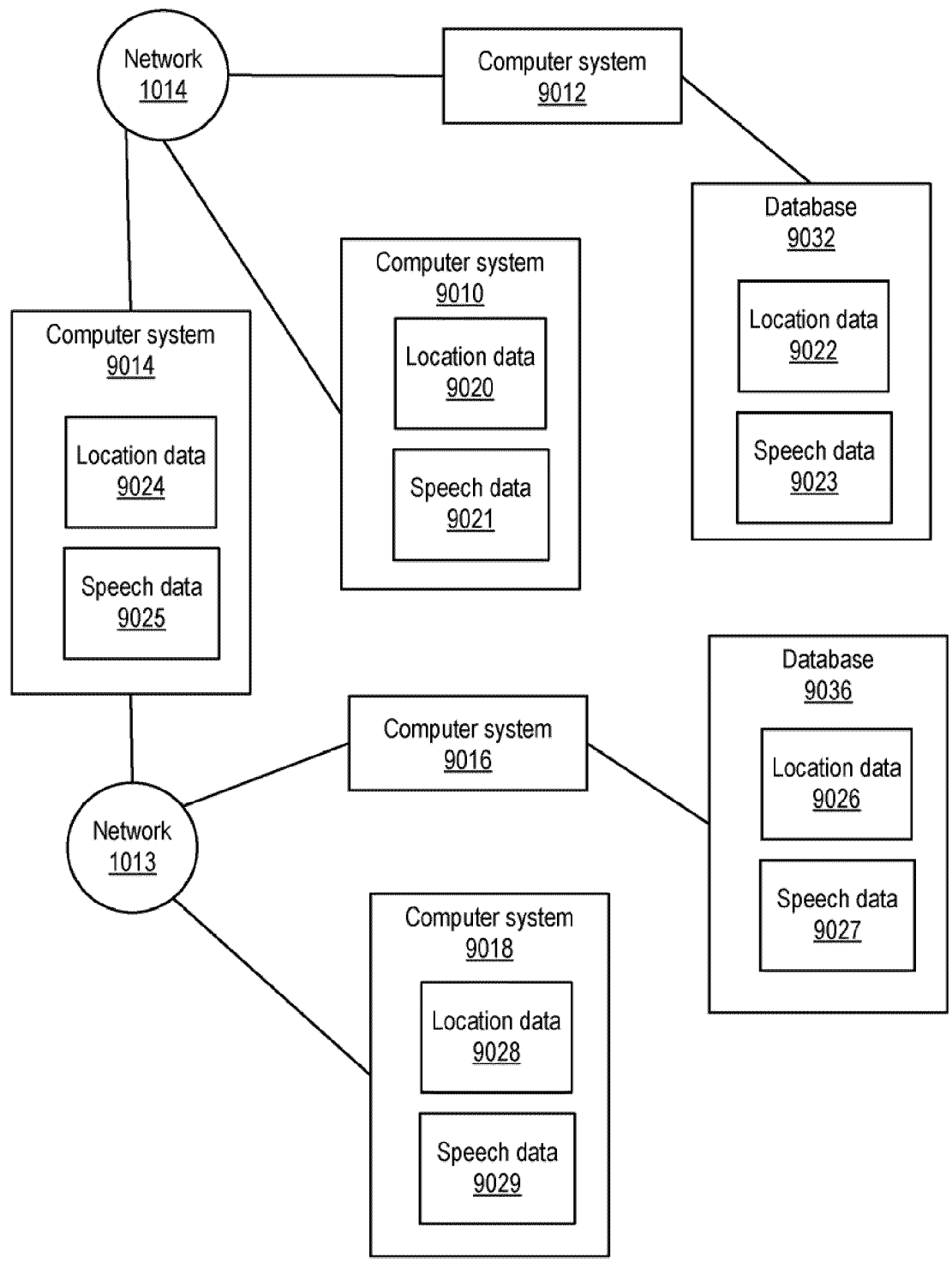
FIG. 9 provides a diagram of one or more computer systems coupled to one or more networks, according to one or more embodiments.

Turning now to FIG. 9, a block diagram of one or more computer systems coupled to one or more networks is illustrated, according to one or more embodiments. As illustrated, computer systems 9010-9014 can be coupled to network 1014. Computer system 9010 can include location data 9020 and speech data 9021, and computer system 9014 can include location data 9024 and speech data 9025. As illustrated, computer system 9012 can be coupled to a database 9032 that can include location data 9022 and speech data 9023. In one example, database 9032 can include a relational database management system (RDBMS). In another example, database 9032 can provide one or more portions of one or more of location data 9022 and speech data 9023 in response to one or more queries.

As shown, computer systems 9014-9018 can be coupled to network 1013, and computer system 9018 can include location data 9028 and speech data 9029. Computer system 9016 can be coupled to a database 9036 that can include location data 9026 and speech data 9027. In one example, database 9036 can include a RDBMS. In another example, database 9036 can provide one or more portions of one or more of location data 9026 and speech data 9027 in response to one or more queries.

Turning now to FIG. 10, a method for providing at least one direction from a first location to a second location is illustrated, according to one or more embodiments. At 10010, an image can be received. In one or more embodiments, the image can be received from an image sensor. In one example, the image can be received from image sensor 3090. In another example, the image can be received from MD 1040. For instance, a computer system (e.g., one of computer systems 9010-9018) can receive the image from MD 1040. At 10015, a first location can be determined. In one or more embodiments, the first location can be determined from the image. For example, the first location can be determined from one or more of reference objects included in the image.

At 10020, speech information can be received. In one or more embodiments, speech information can be received from a user of MD 1040. In one example, speech information can be received from at least one of sound input device 3052 and sound input device 3054. In another example, a computer system (e.g., one of computer systems 9010-9018) can receive the speech information from MD 1040. In one instance, the computer system can receive the speech information from MD 1040 in a compressed format. In one or more embodiments, the speech information from MD 1040 can include an audio compression format that can be a form of data compression to reduce a size of a data transmission of one or more digital audio streams. The data compression format can include one or more of a Motion Pictures Experts Group (MPEG) 2 layer 3 (MP3) format, a MP4 format, an H.264 format, a TTA (True audio) format, and an Apple Lossless format, among others. In one or more embodiments, the data compression format can be based on one or more adaptive prognostic filters.

At 10025, a second location can be determined from the speech information and the first location. For example, the speech information can indicate to find a nearest location of one of a restaurant, a coffee shop, a restroom, a shop, a bank, an automated teller machine, a drug store, a café, and a bus stop, among others. In one or more embodiments, MD 1040 can determine the second location from the speech information and the first location. In one or more embodiments, a computer system (e.g., one of computer systems 9010-9018) can determine the second location from the speech information and the first location. At 10030, orientation information can be received. In one or more embodiments, the orientation information can include orientation information of MD 1040. For example, the orientation information can include one or more of heading information, pitch information, yaw information, and roll information, among others. In one or more embodiments, the orientation information can be received from position device 3080. In one or more embodiments, the orientation information can be received from MD 1040. For example, a computer system (e.g., one of computer systems 9010-9018) can receive the orientation information from MD 1040.

At 10035, one or more directions to the second location can be provided. In one or more embodiments, the one or more directions to the second location can be based on one or more of the first location, the second location, and the orientation information. In one or more embodiments, one or more directions to the second location can be displayed on MD 1040. In one example, MD 1040 can display an overlay pointer (e.g., overlay pointer 5060) on an image to provide one or more directions to the second location to a user of MD 1040. In a second example, MD 1040 can display turn-by-turn directions to the second location in a text format. In another example, MD 1040 can provide audio turn-by-turn directions to the second location to a user of MD 1040. For instance, one or more of sound output device 3042 and sound output device 3044 can be used to provide audio turn-by-turn directions to the second location to a user of MD 1040.

In one or more embodiments, a computer system (e.g., one of computer systems 9010-9018) can provide one or more directions to the second location. In one example, the computer system can provide information to MD 1040 to display an overlay pointer (e.g., overlay pointer 5060) on an image. In a second example, the computer system can provide information to MD 1040 to display turn-by-turn directions to the second location in a text format. In another example, the computer system can provide information to MD 1040 to provide audio turn-by-turn directions to the second location to a user of MD 1040. For instance, one or more of sound output device 3042 and sound output device 3044 can be used to provide audio turn-by-turn directions to the second location to a user of MD 1040.

In one or more embodiments, one or more elements of the method of FIG. 10 can be repeated. For example, a user of MD 1040 can proceed to the second location, and at one or more instances, a current location of MD 1040 can be used as the first location. For instance, speech information may not be received once the second location is determined while other elements of the method of FIG. 10 can be performed to provide one or more directions to a user of MD 1040 to the second location.

Figure 12:
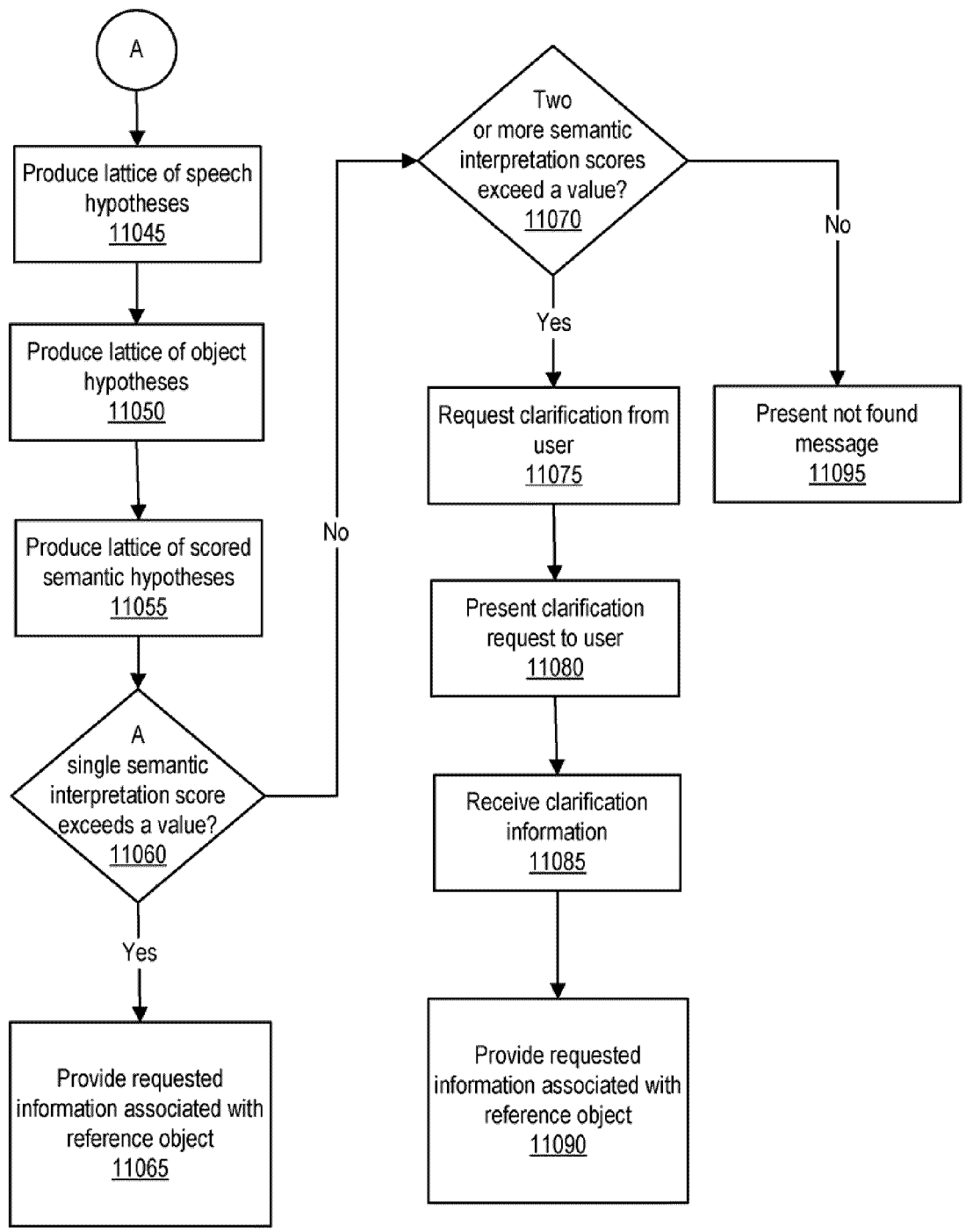

Turning now to FIGS. 11 and 12, a method for providing information is illustrated, according to one or more embodiments. At 11010, an image can be captured. For example, image sensor 3090 can capture (e.g., acquire) the image that can include one or more visible (from a perspective of a user of MD 1040) reference objects. At 11015, the image can be transmitted from MD 1040. At 11020, the image can be received from MD 1040. In one example, MD 1040 can transmit the image via network 1014 to computer system 9010, and computer system 9010 can receive the image via network 1014. In another example, MD 1040 can transmit the image via network 1013 to computer system 9018, and computer system 9018 can receive the image via network 1013.

At 11025, speech information can be received from a user of MD 1040. In one or more embodiments, the user of MD 1040 can issue a spoken request by pressing a button (e.g., a button of buttons 4050-4056) and speaking about one or more of reference objects (e.g., one or more of reference objects 5041-5045, 6041-6044, 7041, 7042, 8041, 8042, etc.) in the image. For example, speech information can be received from the user of MD 1040 via one or more of sound input device 3052 and sound input device 3054. At 11030, the speech information can be compressed. In one or more embodiments, MD 1040 can compress the speech information from the user using an audio compression format or process. For example, the audio compression format or process can include a form of data compression to reduce a size of a data transmission of one or more digital audio streams. The data compression format or process can use one or more of a MP3 format or process, a MP4 format or process, an H.264 format or process, a TTA format or process, and an Apple Lossless format or process, among others. In one or more embodiments, the data compression format or process can be based on one or more adaptive prognostic filters.

At 11035, the speech information can be transmitted from MD 1040. In one or more embodiments, the speech information can be transmitted in a compressed format. At 11040, the speech information can be received from MD 1040. In one example, MD 1040 can transmit the speech information via network 1014 to computer system 9010, and computer system 9010 can receive the speech information via network 1014. In another example, MD 1040 can transmit the speech information via network 1013 to computer system 9018, and computer system 9018 can receive the speech information via network 1013.

At 11045, a lattice of speech hypotheses is produced. In one example, MD 1040 can produce the lattice of speech hypotheses. In a second example, computer system 9010 can produce the lattice of speech hypotheses. For instance, computer system 9010 can use speech data 9021 to produce the lattice of speech hypotheses. In another example, computer system 9018 can produce the lattice of speech hypotheses. For instance, computer system 9018 can use speech data 9029 to produce the lattice of speech hypotheses. In one or more embodiments, the lattice of speech hypotheses is produced based on what is possibly described in the speech information.

At 11050, a lattice of object hypotheses is produced. In one example, MD 1040 can produce the lattice of object hypotheses. In a second example, computer system 9010 can produce the lattice of object hypotheses. For instance, computer system 9010 can use location data 9020 to produce the lattice of object hypotheses. In another example, computer system 9018 can produce the lattice of object hypotheses. For instance, computer system 9018 can use location data 9028 to produce the lattice of object hypotheses. In one or more embodiments, the lattice of object hypotheses is produced based on what reference objects are included in the image.

At 11055, a lattice of scored semantic hypotheses can be produced. In one example, MD 1040 can produce the lattice of scored semantic hypotheses. In a second example, computer system 9010 can produce the lattice of scored semantic hypotheses. In another example, computer system 9018 can produce the lattice of scored semantic hypotheses. In one or more embodiments, the lattice of speech hypotheses and the lattice of object hypotheses can be transmitted to another computer system, and the other computer system can produce the lattice of scored semantic hypotheses. In one or more embodiments, the lattice of scored semantic hypotheses can be produced from multimodal integration that includes integrating the lattice of speech hypotheses, the lattice of object hypotheses, and a finite state machine. In one or more embodiments, a multimodal integration process can include a finite state machine of multimodal states produced by a multimodal grammar to determine possible intersections of a lattice of object hypotheses from the image and a lattice of speech hypotheses from a speech recognition process to produce a lattice of scored semantic hypotheses. In one or more embodiments, the multimodal grammar can specify how different reference objects can be referred to by different combinations of speech and reference objects.

At 11060, it can be determined whether or not a single semantic interpretation score exceeds a predetermined value. If a single semantic interpretation score exceeds a predetermined value, then requested information associated with the reference object can be provided, at 11065. In one example, requested information associated with one or more of reference objects 7041, 7042, 8041, and 8042 can be provided. In one instance, a telephone number of a doctor's office, associated with one or more of reference objects 7041 and 7042, can be provided. For example, a telephone number of a doctor's office, associated with one or more of reference objects 7041 and 7042, can be provided to MD 1040. In another example, a telephone number of a doctor's office, associated with one or more of reference objects 7041 and 7042, can be provided to network 1013 by MD 1040. In another instance, a rating of a restaurant, associated with one or more of reference objects 8041 and 8042, can be provided. For example, a rating of a restaurant, associated with one or more of reference objects 8041 and 8042, can be provided to MD 1040. In another example, a rating of a restaurant, associated with one or more of reference objects 8041 and 8042, can be provided to a user of MD 1040 by MD 1040.

In one or more embodiments, providing requested information can include transmitting the requested information via a network. In one example, computer system 9010 can transmit the requested information to MD 1040 via network 1014. In second example, computer system 9018 can transmit the requested information to MD 1040 via network 1013.

If a single semantic interpretation score does not exceed a predetermined value, then the method can proceed to 11070, where it can be determined whether or not there are two or more semantic interpretation scores for the request that exceed a predetermined value. If there are not two or more semantic interpretation scores for the request that exceed a predetermined value, a "not found" message can be presented to a user of MD 1040, at 11095. In one or more embodiments, the "not found" message can be transmitted to MD 1040 via a network. In one example, computer system 9010 can transmit the "not found" message to MD 1040 via network 1014. In another example, computer system 9018 can transmit the "not found" message to MD 1040 via network 1013.

In one or more embodiments, MD 1040 can display text that includes the "not found" message. In one or more embodiments, MD 1040 can present the "not found" message in an audio fashion. For instance, MD 1040 can use one or more of sound output device 3052 and sound output device 3054 to present the "not found" message in an audio fashion to a user of MD 1040. In one or more embodiments, MD 1040 can use a text to speech transformation process to present the "not found" message in an audio fashion to a user of MD 1040.

If there are two or more semantic interpretation scores for the request that exceed a predetermined value, clarification can be requested of the user of MD 1040, at 11075. In one example, an image, video, etc. can include two or more reference objects associated with similar or same information. In one instance, the two or more reference objects associated with similar or same information such as restaurant information. For example, the two or more reference objects can be associated with pizza, and the speech information can include a query such as "pizza place" (e.g., the user may say "tell me about the pizza place."). Since there can be two or more reference objects associated with pizza, for instance, two or more semantic interpretation scores for the request can exceed a predetermined value, and clarification and/or disambiguation can be requested of the user of MD 1040.

In one or more embodiments, a multimodal management process can initiate a clarification dialogue in a case where a specific most-likely hypothesis cannot be determined and further disambiguation requires spoken or visual interaction with the user of MD 1040 via one or more of audio, text, and graphics. In one or more embodiments, the clarification request can be transmitted to MD 1040 via a network. In one example, computer system 9010 can transmit the clarification request to MD 1040 via network 1014. In another example, computer system 9018 can transmit the clarification request to MD 1040 via network 1013. In one or more embodiments, the clarification request can be provided to a user of MD 1040 by MD 1040.

At 11080, the clarification request can be presented to the user. In one example, MD 1040 can display text that includes the clarification request. In another example, MD 1040 can present the clarification request in an audio fashion. For instance, MD 1040 can use one or more of sound output device 3052 and sound output device 3054 to present the clarification request in an audio fashion to a user of MD 1040. In one or more embodiments, MD 1040 can use a text to speech transformation process to present the clarification request in an audio fashion to a user of MD 1040. In one or more embodiments, the clarification request can include asking a question of the user of MD 1040. In one or more embodiments, the clarification request can include displaying two or more overlay pointers on the display of MD 1040.

At 11085, clarification information can be received. In one or more embodiments, the user of MD 1040 can speak information to clarify a reference object. In one or more embodiments, the speech information including the clarification information can be transmitted to a computer system via a network. In one or more embodiments, the user of MD 1040 can select an overlay pointer to a reference object. In one or more embodiments, the clarification information associated with the overlay pointer selection can be transmitted to a computer system via a network. In one example, computer system 9010 can receive the clarification information from MD 1040 via network 1014. In another example, computer system 9018 can receive the clarification information from MD 1040 via network 1013.

At 11090, requested information associated with the reference object can be provided. In one example, requested information associated with one or more of reference objects 7041, 7042, 8041, and 8042 can be provided. In one instance, a telephone number of a doctor's office, associated with one or more of reference objects 7041 and 7042, can be provided. For example, a telephone number of a doctor's office, associated with one or more of reference objects 7041 and 7042, can be provided to MD 1040. In another example, a telephone number of a doctor's office, associated with one or more of reference objects 7041 and 7042, can be provided to network 1013 by MD 1040. In another instance, a rating of a restaurant, associated with one or more of reference objects 8041 and 8042, can be provided. For example, a rating of a restaurant, associated with one or more of reference objects 8041 and 8042, can be provided to MD 1040. In another example, a rating of a restaurant, associated with one or more of reference objects 8041 and 8042, can be provided to a user of MD 1040 by MD 1040.

In one example, requested information associated with one or more of reference objects 7041, 7042, 8041, and 8042 can be provided to MD 1040. In one instance, a telephone number of a doctor's office, associated with one or more of reference objects 7041 and 7042, can be provided to MD 1040. In another instance, a rating of a restaurant, associated with one or more of reference objects 8041 and 8042, can be provided to MD 1040. In one or more embodiments, providing requested information to MD 1040 can include transmitting the requested information via a network. In one example, computer system 9010 can transmit the requested information to MD 1040 via network 1014. In another example, computer system 9018 can transmit the requested information to MD 1040 via network 1013.

In one or more embodiments, location data stored in a computer system or database (e.g., location data 9020, 9022, 9024, 9026, and 9028) can include one or more of an index of businesses, reference objects, and landmarks with corresponding locations that can be used to produce one or more lattices of object hypotheses. In one or more embodiments, location data stored in a computer system or database can include an index of information about one or more of businesses, reference objects, and landmarks that can be provided to a user of MD 1040. In one or more embodiments, speech data stored in a computer system or database (e.g., speech data 9021, 9023, 9025, 9027, and 9029) can be used to recognize and/or determine text from human speech and/or can be used to produce one or more lattices of speech hypotheses.

In one or more embodiments, the term "memory" can mean a "memory medium" and/or "computer readable medium" which is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage. The memory medium can include other types of memory as well, or combinations thereof. In one or more embodiments, the memory medium can be and/or include an article of manufacture and/or a software product. In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network).

In one or more embodiments, each of the systems described herein may take various forms, including a personal computer system, server computer system, workstation, network appliance, Internet appliance, wearable computing device, personal digital assistant (PDA), laptop, mobile telephone, mobile multimedia device, embedded computer system, television system, and/or other device. In general, the terms "computing device", "computer", and/or "computer system" can be broadly defined to encompass any device having a processor which executes instructions from a memory medium.

In one or more embodiments, the term "packet network" can mean a network that can convey data using multiple packets. For example, a data set can be split into multiple packets and communicated via the packet network. In one instance, the data set can be split into multiple Internet protocol (IP) packets and communicated via the packet network. In a second instance, the data set can be split into multiple transmission control protocol (TCP) packets and communicated via the packet network. In a third instance, the data set can be split into multiple user datagram protocol (UDP) packets and communicated via the packet network. In another instance, the data set can be split into multiple media access control (MAC) packets and communicated via the packet network. In one or more embodiments, the packet network can include a maximum transfer unit (MTU). In one example, the MTU can include a maximum number of bytes that can be included in a packet communicated via the packet network. In another example, the MTU can include a maximum number of bytes of a payload of data that can be included in a packet communicated via the packet network. For instance, the packet can include at least a header and a payload of data, and a number of bytes of the payload of data may not exceed the MTU.

It is noted that, in one or more embodiments, one or more of the method elements described herein and/or one or more portions of an implementation of a method element may be performed in varying orders, can be performed concurrently with one or more of the other method elements and/or one or more portions of an implementation of a method element, or can be omitted. Additional method elements can be performed as desired. In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method comprising:
producing a lattice of object hypotheses based at least in part on a plurality of reference objects identified in an image corresponding to a geographic location, wherein each of the plurality of reference objects is related to a physical object at the geographic location;
receiving input speech information that includes a request for information associated with at least a first reference object of the plurality of reference objects;
producing a lattice of speech hypotheses based on at least a first possible description included in the speech information;
producing a lattice of scored semantic hypotheses based on at least the lattice of object hypotheses and the lattice of speech hypotheses;
determining that a single semantic interpretation score of the lattice of scored semantic hypotheses exceeds a predetermined value; and providing requested information associated with the at least the first reference object of the plurality of reference objects.

2. The method of claim 1, further comprising:
determining that two or more semantic interpretation scores of the lattice of scored semantic hypotheses exceeds the predetermined value;
receiving clarification from a user; and
providing requested information associated with at least a second reference object of the plurality of reference objects.

3. The method of claim 1, wherein a particular physical object related to the first reference object is a building, wherein the first reference object is associated with a particular business entity identified based on the particular physical object, and wherein the request information includes one or more telephone numbers, one or more directions, one or more menus, or a combination thereof associated with the particular business entity.

4. The method of claim 3, further comprising providing the one or more directions by providing output speech information that includes the one or more directions, providing image overlay information that indicates the one or more directions on the image, or both.

5. The method of claim 1, further comprising receiving the image via a packet network, an Internet, a cellular telephone network, a satellite telephone network, or a combination thereof.

6. The method of claim 1, wherein producing the lattice of scored semantic hypotheses based on at least the lattice of object hypotheses and the lattice of speech hypotheses includes producing the lattice of scored semantic hypotheses based on at least the lattice of object hypotheses, the lattice of speech hypotheses, and a finite state machine.

7. The method of claim 1, wherein a particular physical object related to the first reference object is a sign, a lettering, or a street, wherein the first reference object is associated with a particular business entity identified based on the particular physical object, and wherein the requested information includes one or more reviews, one or more ratings, or both associated with the particular business entity.

8. A system comprising:
a processor; and
a memory device coupled to the processor, the memory device including instructions that, when executed by the processor, cause the processor to perform a method comprising:
producing a lattice of object hypotheses based at least in part on a plurality of reference objects identified in an image corresponding to a geographic location, wherein each of the plurality of reference objects is related to a physical object at the geographic location;
receiving input speech information that includes a request for information associated with at least a first reference object of the plurality of reference objects;
producing a lattice of speech hypotheses based on at least a first possible description included in the speech information;
producing a lattice of scored semantic hypotheses based on at least the lattice of object hypotheses and the lattice of speech hypotheses;
determining that a single semantic interpretation score of the lattice of scored semantic hypotheses exceeds a predetermined value; and
providing requested information associated with the at least the first reference object of the plurality of reference objects.

9. The system of claim 8, wherein the method further comprises:
determining that two or more semantic interpretation scores of the lattice of scored semantic hypotheses exceeds the predetermined value;
receiving clarification from a user; and
providing requested information associated with at least a second reference object of the plurality of reference objects.

10. The system of claim 8, wherein the method further comprises receiving the image from an electronic image sensor.

11. The system of claim 8, wherein the method further comprises receiving the image via a packet network, an Internet, a cellular telephone network, a satellite telephone network, or a combination thereof.

12. The system of claim 8, wherein producing the lattice of scored semantic hypotheses based on at least the lattice of object hypotheses and the lattice of speech hypotheses includes producing the lattice of scored semantic hypotheses based on at least the lattice of object hypotheses, the lattice of speech hypotheses, and a finite state machine.

13. The system of claim 8, wherein a particular physical object related to the first reference object is a building, a sign, a lettering, or a street.

14. The system of claim 8, wherein the request information includes one or more directions, and wherein the method further comprises providing the one or more directions by providing output speech information that includes the one or more directions, providing image overlay information that indicates the one or more directions on the image, or both.

15. A computer readable storage device including instructions that, when executed by a processor, cause the processor to perform a method comprising:
producing a lattice of object hypotheses based at least in part on a plurality of reference objects identified in an image corresponding to a geographic location, wherein each of the plurality of reference objects is related to a physical object at the geographic location;
receiving input speech information that includes a request for information associated with at least a first reference object of the plurality of reference objects;
producing a lattice of speech hypotheses based on at least a first possible description included in the speech information;
producing a lattice of scored semantic hypotheses based on at least the lattice of object hypotheses and the lattice of speech hypotheses;
determining that a single semantic interpretation score of the lattice of scored semantic hypotheses exceeds a predetermined value; and
providing requested information associated with the at least the first reference object of the plurality of reference objects.

16. The computer readable storage device of claim 15, wherein the method further comprises:
determining that two or more semantic interpretation scores of the lattice of scored semantic hypotheses exceeds the predetermined value;
receiving clarification from a user; and
providing requested information associated with at least a second reference object of the plurality of reference objects.

17. The computer readable storage device of claim 15, wherein the method further comprises receiving the image from an electronic image sensor.

18. The computer readable storage device of claim 17, wherein the method further comprises receiving the image via a packet network, an Internet, a cellular telephone network, a satellite telephone network, or a combination thereof.

19. The computer readable storage device of claim 15, wherein producing the lattice of scored semantic hypotheses based on at least the lattice of object hypotheses and the lattice of speech hypotheses includes producing the lattice of scored semantic hypotheses based on at least the lattice of object hypotheses, the lattice of speech hypotheses, and a finite state machine.

20. The computer readable storage device of claim 15, wherein the first reference object is associated with a particular business entity, and wherein the requested information includes one or more telephone numbers, one or more directions, one or more review, one or more ratings, one or more menus, or a combination thereof associated with the particular business entity.

* * * * *